United States Patent
Kim et al.

(10) Patent No.: US 12,169,461 B2
(45) Date of Patent: *Dec. 17, 2024

(54) STATUS CHECK USING CHIP ENABLE PIN

(71) Applicant: Micron Technology, Inc., Boise, ID (US)

(72) Inventors: Chulbum Kim, San Jose, CA (US); Mark A. Helm, Santa Cruz, CA (US); Yoav Weinberg, Thornhill (CA)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,773

(22) Filed: Oct. 11, 2022

(65) Prior Publication Data

US 2023/0043140 A1 Feb. 9, 2023

Related U.S. Application Data

(63) Continuation of application No. 17/117,933, filed on Dec. 10, 2020, now Pat. No. 11,500,791.

(51) Int. Cl.
*G06F 13/14* (2006.01)
*G06F 1/26* (2006.01)
*G06F 13/16* (2006.01)

(52) U.S. Cl.
CPC .......... *G06F 13/1668* (2013.01); *G06F 1/266* (2013.01)

(58) Field of Classification Search
CPC .............................. G06F 13/1668; G06F 1/266
See application file for complete search history.

(56) References Cited

U.S. PATENT DOCUMENTS

| | | | |
|---|---|---|---|
| 4,198,700 A | | 4/1980 | Aoyama et al. |
| 4,233,672 A | | 11/1980 | Suzuki et al. |
| 4,392,212 A | * | 7/1983 | Miyasaka ............... H03K 5/151 365/185.16 |
| 5,886,940 A | | 3/1999 | Morzano et al. |
| 6,061,759 A | | 5/2000 | Guo |
| 7,330,378 B2 | | 2/2008 | Perner et al. |
| 7,359,281 B2 | | 4/2008 | Soares et al. |
| 7,523,283 B2 | * | 4/2009 | Kadota ..................... G11C 7/22 711/167 |
| 7,616,514 B2 | | 11/2009 | Lee et al. |
| 8,205,069 B2 | | 6/2012 | Wu et al. |
| 8,364,926 B2 | | 1/2013 | Hampel et al. |
| 9,740,407 B2 | | 8/2017 | Gillingham et al. |
| 9,870,817 B2 | | 1/2018 | Lien et al. |

(Continued)

*Primary Examiner* — Cheng Yuan Tseng
(74) *Attorney, Agent, or Firm* — Holland & Hart LLP

(57) ABSTRACT

Methods, systems, and devices for status check using chip enable pin are described. An apparatus may include a memory device, a pin coupled with the memory device, and a driver coupled with the pin and configured to bias the pin to a first a voltage or a second voltage based on a status of the memory device. The status may indicate, for example, whether the memory device is available to receive a command. The driver may bias the pin to a first voltage based on a first status of the memory device indicating that the memory device is busy. Additionally, or alternatively, the driver may bias the pin to a second voltage based on a second status of the memory device indicating that the memory device is available to receive the command. In some cases, the pin may be an example of a chip enable pin.

20 Claims, 5 Drawing Sheets

(56) References Cited

U.S. PATENT DOCUMENTS

| | | |
|---|---|---|
| 10,381,058 B2 | 8/2019 | Lee |
| 10,535,396 B2 | 1/2020 | Venkata |
| 10,889,122 B2 | 1/2021 | Ng et al. |
| 10,971,212 B2 | 4/2021 | Hou et al. |
| 2007/0143556 A1 | 6/2007 | Kadota |
| 2021/0217480 A1 | 7/2021 | Oh |

* cited by examiner

STATUS CHECK USING CHIP ENABLE PIN

CROSS REFERENCE

The present application for patent is a Continuation of U.S. patent application Ser. No. 17/117,933 by Nam et al., entitled "STATUS CHECK USING CHIP ENABLE PIN," filed Dec. 10, 2020, assigned to the assignee hereof, and expressly incorporated by reference herein.

FIELD OF TECHNOLOGY

The following relates generally to one or more systems for memory and more specifically to status check using chip enable pin.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
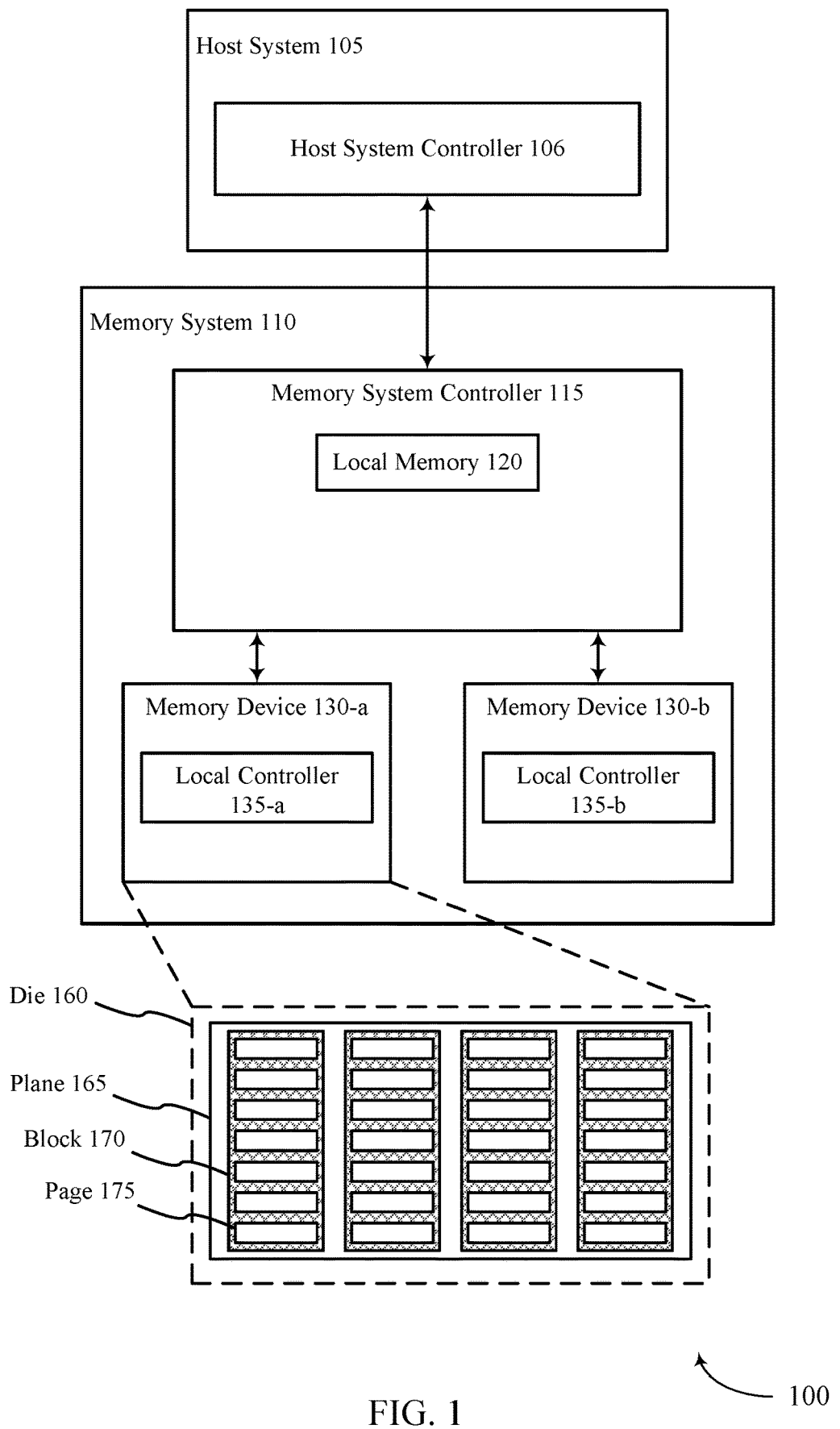
FIG. 1 illustrates an example of a system that supports status check using chip enable pin in accordance with examples as disclosed herein.

A memory device may provide one or more statuses that indicate information about the memory device. For example, a status (e.g., a ready/busy (R/B) status, a pass/fail status, or some other status) may indicate whether the memory device is available to receive a command (e.g., from a host device). In some cases, a device coupled with the memory device (e.g., a host device, a controller, or some other device) may poll the memory device (e.g., via a polling command) to determine the status of the memory device. In some cases, the device may periodically and blindly poll the memory device until the status (e.g., a ready status) indicates that the memory device is ready (i.e., available to receive a command). However, there may be a delay between when the memory device becomes ready and when the device knows the memory device is ready due to periodically polling the memory device, thereby increasing latency of communications with the memory device. Further, polling the memory device may increase overhead and latency of communications with the memory device and decrease bus utilization efficiency due to sending, processing, and responding to the polling command. In some other cases, the memory device may include additional pins dedicated to communicating an R/B status of the memory device, but additional pins may increase a cost of the memory device, and in some cases, may not be able to indicate the R/B status of individual memory dies of the memory device without a polling command.

Techniques, systems, and devices are described herein to determine a status of a memory device by signaling a status using a pin configured to also communicate other information (e.g., a chip enable pin). In some cases, the circuit may determine a status of the memory device without using a polling command or adding pins to the memory device. For example, a memory device may be coupled with a pin that is configured to receive a chip enable (CE) signal for the memory device. A driver may be coupled with the pin and configured to bias the pin to a voltage based on the status of the memory device. For example, if the memory device is busy (i.e., unavailable to receive a command), the driver may bias the pin to a first voltage indicating that the memory device is busy. If the memory device is ready, the driver may bias the pin to a second voltage indicating the memory device is ready. A circuit (e.g., included in a host device, a controller, or some other component) coupled with the pin may be configured to monitor the pin (e.g., a voltage of the pin, a current of the pin) to determine the status of the memory device. Therefore, when the memory device becomes ready, the driver may bias the pin to the second voltage, and the circuit may determine the ready status of the memory device. This approach may enable the circuit to detect when the memory device transitions from busy to ready with less latency than some configurations that use polling to determine a status of the memory device. Such techniques, systems, and devices may improve latency, overhead, cost, and other benefits related to status signaling.

Features of the disclosure are initially described in the context of systems, devices, and circuits as described with reference to FIGS. 1 through 2. Features of the disclosure are described in the context a process flow as described with reference to FIG. 3. These and other features of the disclosure are further illustrated by and described with reference to an apparatus diagram and a flowchart that relate to status check using chip enable pin as described with reference to FIGS. 4 and 5.

FIG. 1 is an example of a system 100 that supports status check using chip enable pin in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 when read from or written to a memory device 130, and may be available within the local memory 120 for subsequent retrieval for or manipulation (e.g., updating) by the host system 105 (e.g., with reduced latency relative to a memory device 130) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). Additionally or alternatively, a memory device 130 may include one or more arrays of volatile memory cells. For example, a memory device 130 may include random access memory (RAM) memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer).

Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

A memory device 130 may provide a status indicating information about the memory device 130 (e.g., an R/B status, a pass/fail status, a health status, or some other status). In some examples, to indicate a status of the memory device 130, the memory device 130 may be coupled with a pin that is configured to receive a CE signal (e.g., that indicates whether the memory device is available to be accessed) for the memory device. The pin of the memory device 130 may be coupled with a driver configured to bias the pin to a voltage based on the status of the memory device 130. For example, the driver may bias the pin to a first voltage if the memory device 130 has a first status and may bias the pin to a second voltage if the memory device 130 has a second status. In some examples, the communication of the status may be configured to avoid colliding with a chip enable signal communicated over the same pin, thereby enabling the pin to communicate both the chip enable signal to the memory device and the status to the circuit. A circuit (e.g., included in the host system controller 106, the memory system controller 115, or some other component of the host system 105 or the memory system 110) coupled with the pin may be configured to monitor the pin (e.g., a voltage of the pin, a current of the pin) to determine the status of the memory device. When the memory device 130 transitions from the first status to the second status, or vice versa, the driver may bias the pin accordingly, and the circuit may determine the new status of the memory device 130. As described herein, this approach may enable detection of the exact timing of when the memory device 130 transitions statuses, thereby providing latency, overhead, cost, among other benefits.

The system 100 may include any quantity of non-transitory computer readable media that support status check using chip enable pin. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, when executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
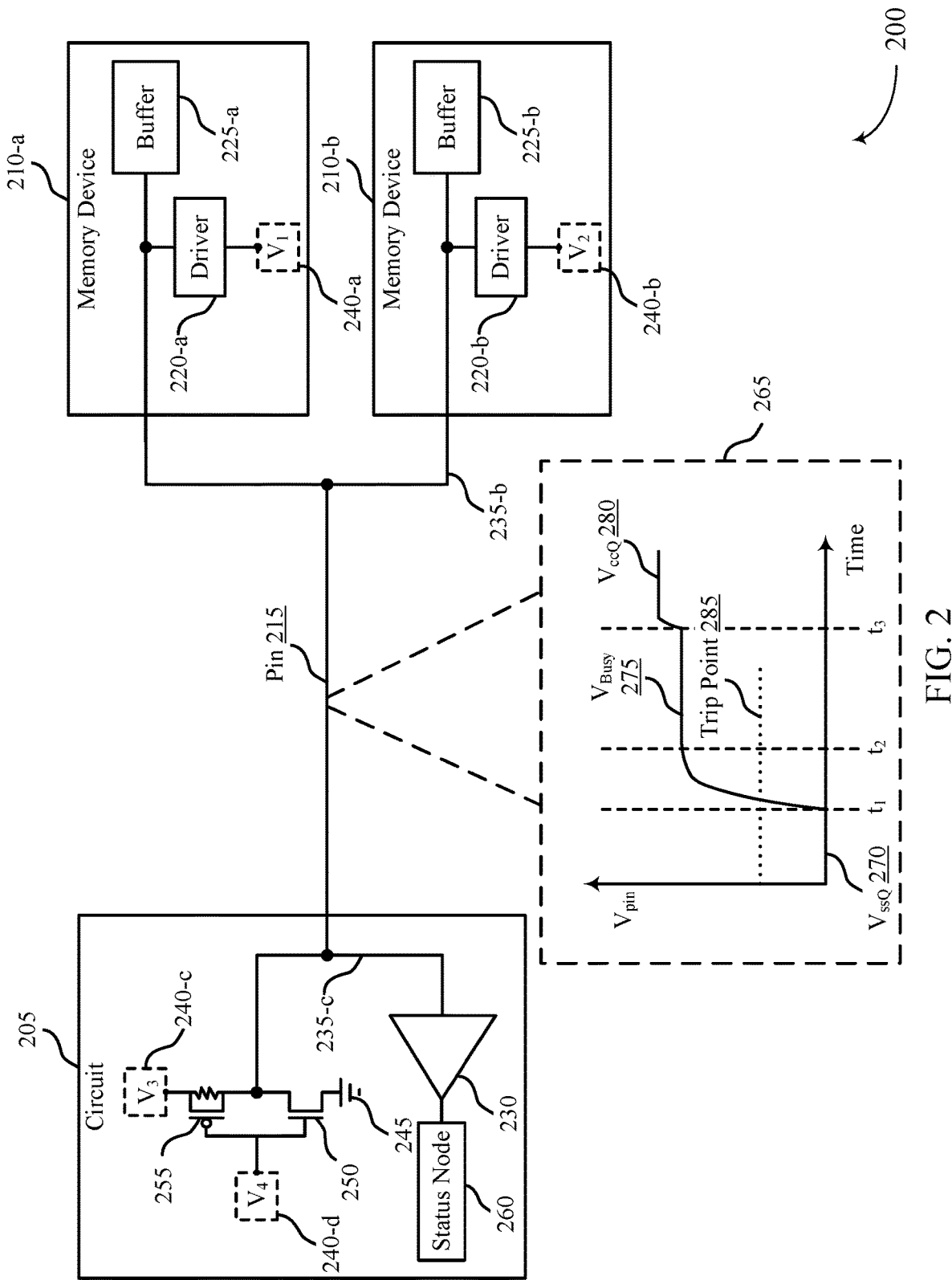
FIG. 2 illustrates an example of a system that supports status check using chip enable pin in accordance with examples as disclosed herein.

FIG. 2 illustrates an example of a system 200 that supports status check using chip enable pin in accordance with examples as disclosed herein. The system 200 may be an example of a system 100 as described with reference to FIG. 1 or aspects thereof. For example, the system 200 may include a circuit 205 and memory devices 210-a, 210-b, which may be examples of a memory system controller 115 or a host system controller 106 or both and a memory device 130, as respectively described with reference to FIG. 1. For illustrative purposes, FIG. 2 depicts two memory devices 210, however the principles disclosed below may be adapted and applied to include any quantity of memory devices as well.

The circuit 205 may be coupled with and communicate with a memory device 210 to perform operations such as access operations. In some cases, the circuit 205 may be an example of an ASIC coupled with the memory devices 210 (e.g., a memory system controller 115, a host system controller 106, or some other controller). The memory device 210 may communicate status information to the circuit, such as whether the memory device 210 is available to receive a command. In some cases, the circuit 205 may periodically poll the memory device 210 to check the status of the memory device 210, however, polling the memory device 210 may result in delays between when the memory device 210 becomes available to receive a command and when the circuit 205 becomes aware that the memory device is available to receive a command. Additionally, in some cases, the circuit 205 may be a CE driver and the pin 215 may be a CE pin. Here, the memory device 210 may be polled using a pin of the memory device 210 other than pin 215 (e.g., an address enable latch pin, a command latch enable pin, a data pin, or some other pin), and the pin 215 may be held low (e.g., biased to a voltage below a voltage indicating whether the memory device 210 is available to be accessed) during the polling. Thus, communicating status information by polling a memory device may increase traffic on other pins of the memory device 210, thereby increasing latency.

To communicate status information without a polling command, the memory device 210 may bias a pin 215 coupled with the memory device 210 and the circuit 205 to a voltage based on a status of the memory device 210. For example, the memory device 210-a may bias the pin 215 to a first voltage when the memory device 210-a is busy (i.e., unavailable to receive a command) and bias the pin 215 to a second voltage when the memory device 210-a is ready (i.e., available to receive a command). The circuit 205 may determine the status of the memory device 210 based on the voltage of the pin 215.

In some examples, the pin 215 may have one or more specific functions. For example, the pin 215 may be a CE pin that is configured to receive a CE signal indicating whether the memory device 210 is available to be accessed. The memory device 210 may include a buffer 225 (e.g., buffer 225-a, buffer 225-b) that receives the CE signal generates an internal CE signal used by the memory device 210. By biasing the pin 215 to the voltage based on the status of the memory device 210, the memory device 210 may communicate information in addition to its original function. In some memory systems, a CE pin may be configured to communicate a CE signal in a single direction (unidirectional communication). In such cases, the CE pin of the circuit 205 may include a driver and the CE pin of the memory devices 210 may include a receiver (e.g., buffer 225-a, buffer 225-b). In the memory systems described herein, the CE pin of the circuit 205 may include both a driver and a receiver and the CE pin of the memory devices 210 may include both a driver and a receiver.

To bias the pin 215 to the voltage, the memory device 210 may include a driver 220. The driver 220 may be coupled to the pin 215 (e.g., via a conductive line 235) and to a voltage source 240. For example, the memory device 210-a may include a driver 220-a that is coupled to the voltage source 240-a and coupled to the pin 215 via a conductive line 235-a. The memory device 210-a may use the driver 220-a to couple the voltage source 240-a to the pin 215. For example, the driver 220-a may include one or more transistors that the memory device 210-a may activate or deactivate to respectively couple or decouple the pin 215 to the voltage source 240-a. In some cases, the voltage source 240-a may be a ground or a virtual ground. Here, the driver 220-a may act as a "pull-down" driver such that coupling the pin 215 to the voltage source may decrease the voltage across the pin 215. In some other cases, the voltage source 240-a may be a voltage supply. Here, the driver 220-a may act as a "pull-up" driver such that coupling the pin 215 to the voltage source 240-a may increase the voltage across the pin 215. In some cases, the drivers 220 may include any quantity of devices or "legs" to pull the signal on the pin to the desired level.

The memory device 210-a may use the driver 220-a to couple the pin 215 to the voltage source 240-a based on a status of the memory device 210-a. For example, if the memory device 210-a is busy, the memory device 210-a may use the driver 220-a to couple the pin 215 to the voltage source 240-a, thus biasing the pin 215 to a first voltage. If the memory device 210-a is ready, the memory device 210-a may use the driver 220-a to decouple the pin 215 from the voltage source 240-a, thus biasing the pin 215 to a second voltage. In some cases, the memory device 210-a may decouple the pin 215 from the voltage source 240-a if the memory device 210-*a* is busy and couple the pin 215 to the voltage source 240-*a* if the memory device is ready.

The circuit 205 may determine the status of the memory device 210-*a* based on the voltage to which the pin 215 is biased. For example, the circuit 205 may include a receiver 230 that is used to monitor the voltage of the pin 215. The receiver 230 may be coupled with the pin 215 via a conductive line 235-*c* and may be coupled to other components of the circuit 205 via the conductive line 235-*c*. In some examples, the receiver 230 may determine the status of the memory device 210-*a* by comparing the voltage of the pin 215 to a set of voltages. For example, each voltage of the set of voltages may be associated with a status of the memory device 210-*a*. The receiver 230 may compare the voltage of the pin 215 to the set of voltages to determine a voltage of the set of voltages. The receiver 230 may determine the status of the memory device 210-*a* based on the status associated with the determined voltage. In some examples, the receiver 230 may be a series of analog comparators, where each analog comparator is associated with a voltage of the set of voltages. In some other examples, the receiver 230 may be a digital comparator that identifies the value of the voltage of the pin 215 and compares it to the set of voltages. In some cases, the receiver 230 may determine the status of the memory device 210-*a* by comparing a current of the pin 215 to a set of currents, where each current of the set of currents is associated with a status of the memory device 210-*a*.

In some examples, the pin 215 may be biased according to timing diagram 265. For example, prior to time $t_1$, the circuit 205 may bias the pin 215 to a voltage $V_{ssQ}$ 270. To bias the pin 215 to $V_{ssQ}$ 270, the circuit 205 may include one or more voltage sources 240 and one or more transistors among other components. For example, the circuit 205 may include a voltage source 240-*c*, a voltage source 240-*d*, a transistor 250, and a transistor 255. The circuit 205 may bias the pin 215 to a voltage by activating the transistor 250 and the transistor 255. The circuit 205 may activate the transistor 250 and the transistor 255 by applying the voltage supplied by the voltage source 240-*d* to gates of the transistor 250 and the transistor 255 thereby connecting the voltage source 240-*c* to the conductive line 235-*c*. Based on the voltages supplied by the voltage source 240-*c* and the voltage source 240-*d*, the circuit 205 may bias the pin 215 to a range of voltages including $V_{ssQ}$ 270.

In some examples, biasing the pin 215 to $V_{ssQ}$ 270 may indicate that the memory device 210-*a* is being accessed (e.g., the CE signal indicates that the memory device 210-*a* is enabled). That is, biasing the pin 215 to $V_{ssQ}$ 270 may enable the memory device 210-*a* to receive commands from the circuit 205 or from another component (e.g., a controller, a host device) coupled with the memory device 210-*a*. Biasing the pin 215 to $V_{ccQ}$ 280 may indicate that the memory device 210-*a* is not being accessed (e.g., the CE signal indicates the memory device 210-*a* is not enabled).

At $t_1$, the circuit 205 may begin to bias the pin 215 to a voltage $V_{ccQ}$ 280. For example, the memory device 210-*a* may receive a command prior to $t_1$ and may begin to perform the command. The voltage of the pin 215 may increase above a trip point 285 (e.g., 45 mV less than $V_{ccQ}$ 280, or some other voltage) that indicates that the memory device 210-*a* is unavailable to be accessed. That is, if the voltage of the pin 215 is above the trip point 285, the memory device 210-*a* may be unavailable to be accessed. In response to receiving the command prior to $t_1$, the memory device 210-*a* may enter a busy state and use the driver 220-*a* to couple the pin 215 to the voltage source 240-*a*

At $t_2$, the memory device 210-*a* may bias the pin 215 to $V_{Busy}$ 275 because the memory device 210-*a* is executing a command and may not available to receive another command. For example, the circuit 205 may apply a voltage $V_{ccQ}$ 280 to the pin 215, however, coupling the pin 215 to the voltage source 240-*a* using the driver 220-*a* may reduce the voltage of the pin 215 to $V_{Busy}$ 275. For example, the driver 220-*a* may act as a pull-down driver such that when the driver 220-*a* couples the pin 215 to the voltage source 240-*a*, the voltage of the pin 215 is reduced. The receiver 230 may determine that the memory device 210-*a* is busy based on the pin 215 being biased to $V_{Busy}$ 275. The level of $V_{Busy}$ 275 may be configured to be below $V_{ccQ}$ 280 (which is used to designate that there is CE signal) and above the trip point 285 (which is the reference level used by the receivers of the memory devices 210 to distinguish between whether the CE signal is on or off).

At $t_3$, the memory device 210-*a* may enter a ready state. In response to entering the ready state, the memory device 210-*a* may use the driver 220-*a* to decouple the pin 215 from the voltage source 240-*a*. As a result of decoupling the pin 215 from the voltage source 240-*a*, the memory device 210-*a* may bias the pin 215 to $V_{ccQ}$ 280. The receiver may determine that the memory device 210-*a* is ready based on the pin 215 being biased to $V_{ccQ}$ 280. In some cases, biasing (by the driver 220) to the level that indicates that the memory device 210 is ready to receive another signal includes turning off the driver 220 and allowing the signal to be biased to $V_{ccQ}$ 280, or some other voltage.

In the example of timing diagram 265, the pin 215 may be referred to as an "active low" pin. That is, when pin 215 is biased to a voltage below the trip point 285, the memory device 210-*a* may be available to be accessed. In some cases, the pin 215 may be an "active high" pin such that the memory device 210-*a* is available to be accessed when the pin 215 is biased to a voltage above the trip point 285. Here, $V_{Busy}$ 275 may be below the trip point 285, and the circuit 205 may bias the pin 215 to $V_{ccQ}$ 280 prior to $t_1$ and to $V_{ssQ}$ 270 after $t_1$. Additionally, in this case, the driver 220-*a* may act as a pull-up circuit such that when the driver 220-*a* couples the pin 215 to the voltage source 240-*a*, the voltage of the pin 215 is increased.

In some examples, the memory device 210-*a* may include multiple drivers 220 (not shown) to communicate information about multiple statuses of the memory device 210-*a* over multiple pins 215. For example, the memory device 210-*a* may include a first driver 220 to bias a first pin 215 based on a first status of the memory device 210-*a* and a second driver 220 to bias a second pin 215 based on a second status of the memory device 210-*a*. For example, the first status may indicate whether the memory device 210-*a* is busy or ready and the second status may indicate whether the memory device 210-*a* successfully performed an operation. The memory device 210-*a* may use the first driver 220 to bias the first pin 215 to a first voltage or a second voltage based on the first status and may use the second driver 220 to bias the second pin 215 to a third voltage or a fourth voltage based on the second status. The receiver 230 may determine the first status based on comparing the voltage of the first pin to a set of voltages and may determine the second status based on comparing the voltage of the second pin 215 to the set of voltages. In some examples, additional drivers 220 may be included in the memory device 210-*a* to communicate additional status information using additional pins 215.

In some examples, the pin 215 may be biased to a voltage to communicate status information for more than one memory device. For example, the pin 215 may be coupled to the memory device 210-*a* via the conductive line 235-*a* and to the memory device 210-*b* via a conductive line 235-*b*. The driver 220-*a* may be configured to bias the pin 215 to a first voltage or a second voltage based on a status of the memory device 210-*a*, and the driver 220-*b* may be configured to bias the pin 215 to a third voltage or a fourth voltage based a status of the memory device 210-*b*. For example, if the memory device 210-*a* and the memory device 210-*b* are ready, the drivers 220 may not be coupled to the pin 215 and the voltage of the pin 215 may be $V_{ccQ}$ 280. The receiver 230 may determine that both the memory devices 210 are ready based on the voltage of the pin 215 being biased to $V_{ccQ}$ 280. However, if one or both of the memory device 210 are busy, a respective driver 220 may couple the pin 215 to a respective voltage source 240, thereby reducing the voltage of the pin 215 if the drivers 220 are acting as pull-down drivers. Based on the reduced voltage of the pin 215, the receiver 230 may determine which of the memory devices 210 are busy. In some examples, the first voltage, the second voltage, the third voltage, and the fourth voltage are greater than the trip point 285 if the pin 215 is an active low pin, or less than the trip point 285 if the pin 215 is an active high pin.

The driver 220-*a* and the driver 220-*b* may bias the pin 215 based on a respective resistance of the drivers 220. For example, the driver 220-*a* may have a first resistance and the driver 220-*b* may have a second resistance different from the first resistance. In some cases, the first resistance and the second resistance may be intrinsic resistances of the respective drivers 220. In some cases, the driver 220-*a* may include a resistor having the first resistance, and the driver 220-*b* may include a resistor having the second resistance. Due to first resistance and the second resistance being different, coupling the pin 215 to the voltage source 240-*a* may reduce the voltage of the pin 215 by a different amount than coupling the pin 215 to the voltage source 240-*b*. For example, if the first resistance is greater than the second resistance, coupling the pin 215 to the voltage source 240-*a* may reduce the voltage of the pin 215 more than coupling the pin 215 to the voltage source 240-*b*. In this way, the receiver 230 may determine the status information for each memory device 210. The resistances of each driver 220 of each memory device 210 may be configured such that the circuit 205 may be capable of determining whether any combination of memory devices 210 are available to receive a command based on the voltage level or impedance of the pin. For example, if a single memory device 210 is ready, the pin may be driven to a first level; if a first memory device 210-*a* and a second memory device 210-*b* are ready, the pin may be driven to a second level; or if a first memory device 210-*a* and a third memory device (not shown) are ready, the pin may be driven to a third level. Thus, multiple memory devices 210 can use the same pin and/or channel to communicate ready signals and the circuit 205 may be able to uniquely identify which memory device is ready. In effect, the status signals on the pin may be multiplexed in such a way as to encode which memory devices are ready.

In some examples, the memory device 210-*a* and the memory device 210-*b* may be dies (e.g., dies 160) that are included in a single memory device 210. In some cases, additional dies may be included in the single memory device 210. The circuit 205 may determine status information of each die of the single memory device 210 based on the voltage to which the pin 215 is biased.

Figure 3:
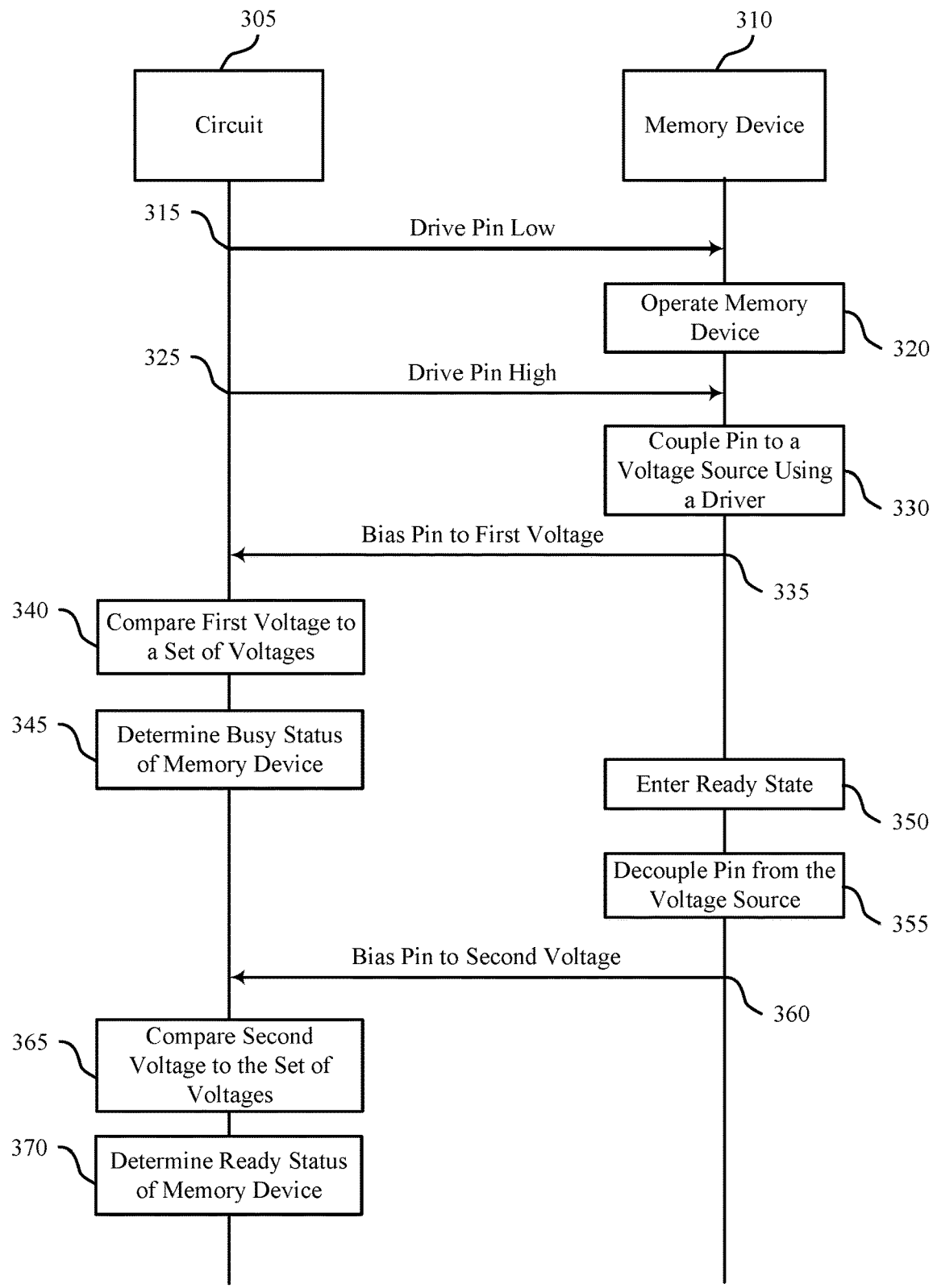
FIG. 3 illustrates an example of a process flow that supports status check using chip enable pin in accordance with examples as disclosed herein.

FIG. 3 illustrates an example of a process flow 300 that supports status check using chip enable pin in accordance with examples as disclosed herein. Aspects of the process flow 300 may be implemented by components of a system, such as systems 100 and 200 described with reference to FIGS. 1 and 2, respectively. For example, process flow 300 may be implemented by a circuit 305 and a memory device 310, which may be examples of circuit 205, and memory devices 130, 210, as described with reference to FIGS. 1 and 2, respectively. Process flow 300 may be implemented to reduce latency, overhead, and cost of the memory device 310, among other benefits. Aspects of the process flow 300 may be implemented by a controller, among other components. Additionally or alternatively, aspects of the process flow 300 may be implemented as instructions stored in memory (e.g., firmware stored in a memory coupled with the memory device 310). For example, the instructions, when executed by a controller (e.g., the circuit 305), may cause the controller to perform the operations of the process flow 300.

In the following description of the process flow 300, the operations may be performed in different orders or at different times. Some operations may also be omitted from the process flow 300, and other operations may be added to the process flow 300.

At 315, a pin coupled with the memory device 310 may be driven low. For example, the circuit 305 may be coupled with the pin and may drive the pin low. In some examples, driving the pin low may indicate that the memory device 310 is available to be accessed. For example, the pin may be a CE pin and driving the CE pin low may enable the memory device 310 to receive write commands, read commands, or other access commands from the circuit 305 or another component coupled with the memory device 310.

At 320, the memory device 310 may be operated. For example, while the pin is driven low, the circuit 305 or another component coupled with the memory device 310 may send one or more access commands to the memory device 310.

At 325, the pin may be driven high. For example, the circuit 305 may drive the pin high. In some examples, driving the pin high may indicate that the memory device is unavailable to be accessed. For example, the pin may be a CE pin and driving the CE pin high may disable the memory device 310 from receiving write commands, read commands, or other access commands from the circuit 305 or another component coupled with the memory device 310. In some cases, the circuit 305 may drive the pin high in response to the memory device 310 receiving an access command. For example, the memory device 310 may receive an access command and begin to process the access command. The memory device 310 may enter a busy state while processing the access command and the circuit 305 may drive the pin high to disable to memory device 310 from receiving additional access commands.

At 330, the pin may be coupled with a voltage source. For example, in response to entering the busy state, the memory device 310 may use a driver to couple the pin with a voltage source. In some cases, the voltage source may be a ground or a virtual ground. In some examples, the driver may include one or more transistors, and the memory device 310 may couple the pin with the voltage source by activating the one or more transistors.

At 335, the pin may be biased to a first voltage. For example, by coupling the pin with the voltage source, the memory device 310 may bias the pin to the first voltage. Although process flow 300 depicts 335 as occurring after 330, in some examples, 335 may occur concurrently with 330. In some examples, the driver may include a resistance. In some cases, the resistance may be an intrinsic resistance of the driver. In some other cases, the driver may include a resistor having a resistance. In some examples, biasing the pin to the first voltage may be based on the resistance of the driver.

At 340, the first voltage may be compared to a set of voltages. For example, the circuit 305 may compare the first voltage to a set of voltages using a receive coupled with the pin of the circuit 305. In some cases, the set of voltages may be defined such that each voltage of the set of voltages is associated with a status of the memory device 310. In some examples, biasing the pin to the first voltage may result in a first current across the pin, and the circuit 305 may compare the first current to a set of currents. In some cases, the set of currents may be defined such that each current of the set of currents is associated with a status of the memory device 310.

At 345, the busy status of the memory device 310 may be determined. For example, the first voltage may be associated the busy status, and, based on comparing the first voltage to the set of voltages, the circuit 305 may determine that the memory device 310 is busy. In some examples, the circuit 305 may determine that the memory device 310 is busy based on comparing the first current to the set of currents.

At 350, a ready state may be entered. For example, the memory device 310 may finish processing the previously received access command and enter a ready state such that the memory device 310 may be available to receive another access command.

At 355, the pin may be decoupled from the voltage source (e.g., the one or more devices of driver at the memory device 310 may be deactivated to isolate the pin from the voltage source). For example, in response to entering the ready state, the memory device 310 may use a driver to decouple the pin from the voltage source. In some examples, the memory device 310 may decouple the pin from the voltage source by deactivating one or more transistors included in the driver.

At 360, the pin may be biased to a second voltage. For example, by using the driver to decouple the pin from the voltage source, the memory device 310 may bias the pin to second first voltage. Although process flow 300 depicts 360 as occurring after 350 and 355, in some examples, 360 may occur concurrently with 350 and 355.

At 365, the second voltage may be compared to the set of voltages. For example, the circuit 305 may compare the second voltage to the set of voltages. In some examples, biasing the pin to the second voltage may result in a second current across the pin, and the circuit 305 may compare the second current to a set of currents.

At 370, the ready status of the memory device may be determined. For example, the second voltage may be associated the ready status, and, based on comparing the second voltage to the set of voltages, the circuit 305 may determine that the memory device 310 is ready. In some examples, the circuit 305 may determine that the memory device 310 is ready based on comparing the second current to the set of currents. Therefore, the status of a memory device may be determined without a polling command.

Figure 4:
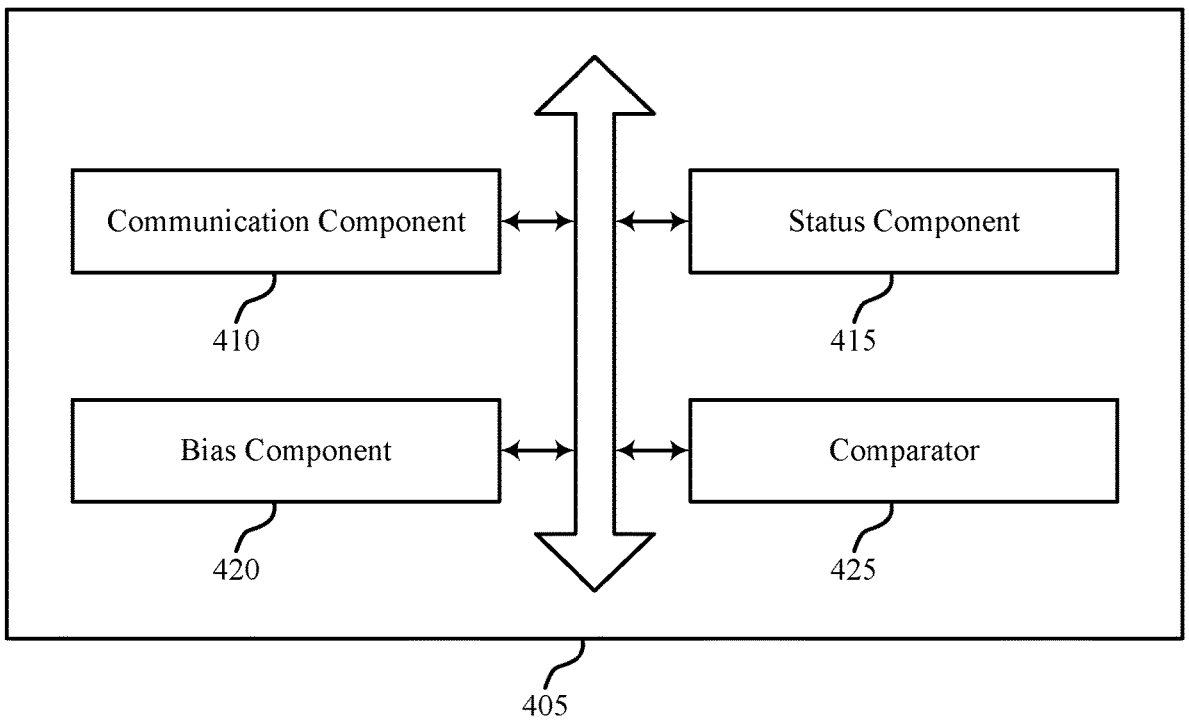
FIG. 4 shows a block diagram of a memory device that supports status check using chip enable pin in accordance with examples as disclosed herein.

FIG. 4 shows a block diagram 400 of a system 405 that supports status check using chip enable pin in accordance with examples as disclosed herein. The system 405 may be an example of aspects of a system as described with reference to FIGS. 1 through 2. The system 405, or various components thereof, may be an example of means for performing various aspects of status check using chip enable pin as described herein. For example, the system 405 may include a communication component 410, a status component 415, a bias component 420, a comparator 425, or any combination thereof. Each of these components may communicate, directly or indirectly, with one another (e.g., via one or more buses).

The communication component 410 may be configured as or otherwise support a means for receiving, by a memory device, a chip enable signal over a pin configured to receive the chip enable signal. The status component 415 may be configured as or otherwise support a means for determining a status of the memory device based on receiving the chip enable signal, the status indicating whether the memory device is available to receive a command. The bias component 420 may be configured as or otherwise support a means for biasing the pin to a voltage to indicate the status based on determining the status of the memory device.

In some examples, to support biasing the pin to the voltage, the bias component 420 may be configured as or otherwise support a means for biasing the pin to a first voltage based on a first status of the memory device, the first status indicating that the memory device is busy. In some instances, to support biasing the pin to the voltage, the bias component 420 may be configured as or otherwise support a means for biasing the pin to a second voltage based on a second status of the memory device, the second status indicating that the memory device is available to receive a command. In some cases, the first voltage is lower than the second voltage. In some other cases, the second voltage is lower than the first voltage.

In some examples, to support biasing the pin to the voltage, the bias component 420 may be configured as or otherwise support a means for coupling the pin with a voltage source using a driver configured to bias the pin to the voltage based on determining the status. In some cases, biasing the pin to the voltage is based on a resistance of the driver.

In some examples, the status component 415 may be configured as or otherwise support a means for determining a status of a second memory device based on receiving the chip enable signal. In some instances, the bias component 420 may be configured as or otherwise support a means for biasing the pin to a second voltage based on determining the status of the second memory device.

In some cases, to support determining the status of the memory device, the comparator 425 may be configured as or otherwise support a means for comparing the voltage to a set of voltages associated with the status of the memory device. In some examples, to support determining the status of the memory device, the comparator 425 may be configured as or otherwise support a means for comparing a current of the pin to a set of currents associated with the status of the memory device, where the current of the pin is based on biasing the pin to the voltage. In some instances, the voltage may satisfy a threshold voltage that indicates that the memory device is unavailable to be accessed.

Figure 5:
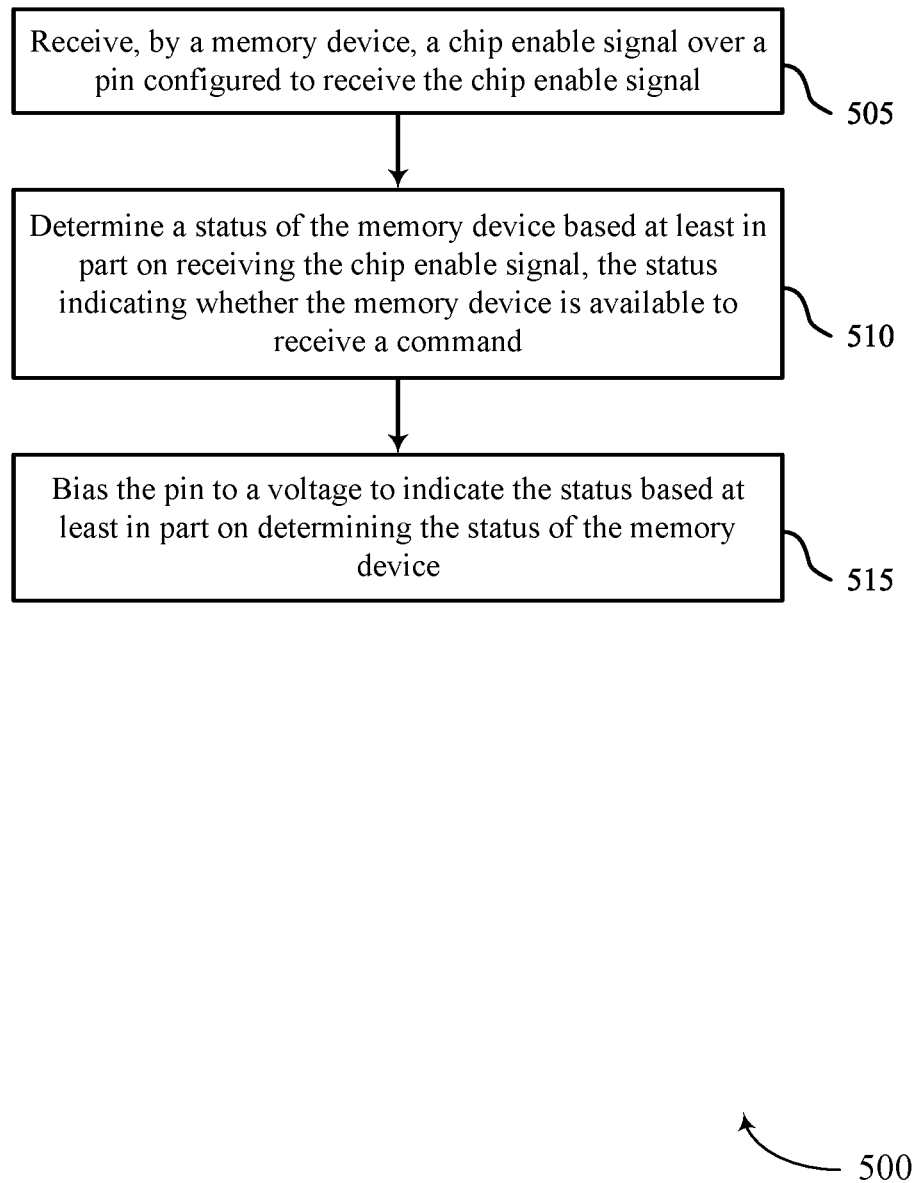
FIG. 5 shows a flowchart illustrating a method or methods that support status check using chip enable pin in accordance with examples as disclosed herein.

FIG. 5 shows a flowchart illustrating a method 500 that supports status check using chip enable pin in accordance with examples as disclosed herein. The operations of method 500 may be implemented by a memory device or its components as described herein. For example, the operations of method 500 may be performed by a memory device as described with reference to FIGS. 1 through 4. In some examples, a memory device may execute a set of instructions to control the functional elements of the device to perform the described functions. Additionally or alternatively, the memory device may perform aspects of the described functions using special-purpose hardware.

At 505, the method may include receiving, by a memory device, a chip enable signal over a pin configured to receive the chip enable signal. The operations of 505 may be performed in accordance with examples as disclosed herein. In some examples, aspects of the operations of 505 may be performed by a communication component 410 as described with reference to FIG. 4.

At 510, the method may include determining a status of the memory device based on receiving the chip enable signal, the status indicating whether the memory device is available to receive a command. The operations of 510 may be performed in accordance with examples as disclosed herein. In some examples, aspects of the operations of 510 may be performed by a status component 415 as described with reference to FIG. 4.

At 515, the method may include biasing the pin to a voltage to indicate the status based on determining the status of the memory device. The operations of 515 may be performed in accordance with examples as disclosed herein. In some examples, aspects of the operations of 515 may be performed by a bias component 420 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving, by a memory device, a chip enable signal over a pin configured to receive the chip enable signal, determining a status of the memory device based on receiving the chip enable signal, the status indicating whether the memory device is available to receive a command, and biasing the pin to a voltage to indicate the status based on determining the status of the memory device.

In some instances of the method 500 and the apparatus described herein, biasing the pin to the voltage may include operations, features, circuitry, logic, means, or instructions for biasing the pin to a first voltage based on a first status of the memory device, the first status indicating that the memory device may be busy, and biasing the pin to a second voltage based on a second status of the memory device, the second status indicating that the memory device may be available to receive a command.

In some cases of the method 500 and the apparatus described herein, the first voltage may be lower than the second voltage. In some other cases, of the method 500 and the apparatus described herein, the second voltage may be lower than the first voltage.

In some examples of the method 500 and the apparatus described herein, biasing the pin to the voltage may include operations, features, circuitry, logic, means, or instructions for coupling the pin with a voltage source using a driver configured to bias the pin to the voltage based on determining the status.

Some examples of the method 500 and the apparatus described herein may further include operations, features, circuitry, logic, means, or instructions for biasing the pin to the voltage may be based on a resistance of the driver.

Some examples of the method 500 and the apparatus described herein may further include operations, features, circuitry, logic, means, or instructions for determining a status of a second memory device based on receiving the chip enable signal, and biasing the pin to a second voltage based on determining the status of the second memory device.

In some instances of the method 500 and the apparatus described herein, determining the status of the memory device may include operations, features, circuitry, logic, means, or instructions for comparing the voltage to a set of voltages associated with the status of the memory device, or comparing a current of the pin to a set of currents associated with the status of the memory device, where the current of the pin may be based on biasing the pin to the voltage.

In some cases of the method 500 and the apparatus described herein, the voltage satisfies a threshold voltage that indicates that the memory device may be unavailable to be accessed.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory device, a pin coupled with the memory device and configured to receive a chip enable signal for the memory device, and a driver coupled with the pin and configured to bias the pin to a first voltage or a second voltage based on a status of the memory device, the status indicating whether the memory device is available to receive a command In some examples, the driver may be configured to bias the pin to the first voltage based on a first status of the memory device, the first status indicating that the memory device may be busy and bias the pin to the second voltage based on a second status of the memory device, the second status indicating that the memory device may be available to receive the command.

In some cases, the first voltage may be lower than the second voltage. In some other cases of the apparatus, the second voltage may be lower than the first voltage.

In some instances, the driver may include one or more transistors configured to couple the pin with a voltage source, where biasing the pin to the first voltage or the second voltage may be based on coupling the pin with the voltage source using the one or more transistors.

In some examples, the apparatus may include a second memory device coupled with a conductive line associated with the pin of the memory device, the second memory device including a second driver configured to bias the conductive line to a third voltage or a fourth voltage based on a status of the second memory device.

In some cases, the driver includes a first resistance and the second driver includes a second resistance different from the first resistance.

In some instances, the apparatus may include a circuit coupled with the pin and configured to determine the status of the memory device and the status of the second memory device based on biasing the pin to the first voltage, the second voltage, the third voltage, or the fourth voltage.

In some examples, the apparatus may include a circuit coupled with the pin and configured to determine the status of the memory device based on comparing a voltage of the pin to a set of voltages or based on comparing a current of the pin to a set of currents.

In some cases, the first voltage and the second voltage satisfy a threshold voltage of the chip enable signal that indicates that the memory device may be unavailable to be accessed.

Another apparatus is described. The apparatus may include a memory device, a pin coupled with the memory device and configured to receive a chip enable signal for the memory device, a controller coupled with the memory device and the pin, where the controller is operable to cause the apparatus to, determine a status of the memory device based on receiving the chip enable signal, the status indicating whether the memory device is available to receive a command, and bias the pin to a voltage based on determining the status of the memory device In some examples, to bias the pin to the voltage, the controller may be operable to cause the apparatus to bias the pin to a first voltage based on a first status of the memory device, the first status indicating that the memory device may be busy and bias the pin to a second voltage based on a second status of the memory device, the second status indicating that the memory device may be available to receive the command.

In some cases, the first voltage may be lower than the second voltage. In some other examples, the second voltage may be lower than the first voltage.

In some instances, to bias the pin to the voltage, the controller may be operable to cause the apparatus to couple the pin with a voltage source using a driver configured to bias the pin to the voltage based on determining the status.

In some examples, biasing the pin to the voltage may be based on a resistance of the driver.

In some cases, the apparatus may include a second memory device coupled with the pin, where the controller may be operable to cause the apparatus to, determine a status of the second memory device based on receiving the chip enable signal, and bias the pin to a second voltage based on determining the status of the second memory device.

In some instances, to determine the status of the memory device, the controller may be operable to cause the apparatus to compare the voltage to a set of voltages associated with the status of the memory device or compare a current of the pin to a set of currents associated with the status of the memory device, where the current of the pin may be based on biasing the pin to the voltage.

In some examples, the voltage satisfies a threshold voltage that indicates that the memory device may be unavailable to be accessed.

Another apparatus is described. The apparatus may include a memory device, a pin coupled with the memory device, and a driver coupled with the pin and configured to bias the pin to a first voltage or a second voltage based on a status of the memory device, the status indicating whether the memory device is available to receive a command.

In some examples, the status indicates whether the memory device successfully performed an operation.

In some cases, the driver may be configured to bias the pin to the first voltage based on a first status of the memory device, the first status indicating that the memory device successfully performed the operation and bias the pin to the second voltage based on a second status of the memory device, the second status indicating that the memory device failed to perform the operation.

In some instances, the apparatus may include a second pin coupled with the memory device and a second driver coupled with the second pin and configured to bias the pin to a third voltage or a fourth voltage based on the status of the memory device.

In some examples, the status indicates whether the memory device successfully performed an operation.

In some cases, the pin may be dedicated to communicating the status of the memory device.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory system, comprising:
    one or more memory devices comprising one or more drivers;
    a pin coupled with the one or more memory devices and configured to receive a chip enable signal for the one or more memory devices; and
    one or more controllers coupled with the one or more memory devices and the pin, wherein the one or more controllers are configured to cause the memory system to:
        bias the pin to a first voltage, the first voltage corresponding to a first status of the one or more memory devices, the first status indicating that the one or more memory devices are accessible;
        bias the pin to a second voltage, the second voltage corresponding to a second status of the one or more memory devices, the second status indicating that the one or more memory devices are inaccessible; and determine the first status, the second status, or both of the one or more memory devices based at least in part on comparing the first voltage and the second voltage to a set of voltages associated with statuses of the one or more memory devices.

2. The memory system of claim 1, wherein the first voltage is lower than the second voltage.

3. The memory system of claim 1, wherein, to bias the pin to the first voltage or to bias the pin to the second voltage, the one or more controllers are configured to cause the memory system to:
couple the pin with a voltage source based at least in part on the first status of the one or more memory devices, the second status of the one or more memory devices, or both.

4. The memory system of claim 1, wherein the one or more controllers are configured to cause the memory system to bias the pin to the first voltage and the second voltage based at least in part on a resistance of the one or more drivers.

5. The memory system of claim 1, wherein the one or more controllers are configured to cause the memory system to:
transmit the chip enable signal to the one or more memory devices;
determine the first status, the second status, or both of the one or more memory devices based at least in part on the chip enable signal; and
bias the pin to a third voltage based at least in part on the first status, the second status, or both of the one or more memory devices.

6. The memory system of claim 1, wherein, to determine the first status, the second status, or both of the one or more memory devices, the one or more controllers are configured to cause the memory system to:
compare a current of the pin to a set of currents associated with the statuses of the one or more memory devices, wherein the current of the pin is based at least in part on the pin being biased to the first voltage or the second voltage.

7. The memory system of claim 1, wherein the second voltage satisfies a threshold voltage that indicates that the one or more memory devices are inaccessible.

8. A method, comprising:
biasing, by one or more controllers, a pin configured to receive a chip enable signal for one or more memory devices to a first voltage, the first voltage corresponding to a first status of the one or more memory devices, the first status indicating that the one or more memory devices are accessible;
biasing, by the one or more controllers, the pin to a second voltage, the second voltage corresponding to a second status of the one or more memory devices, the second status indicating that the one or more memory devices are inaccessible; and
determining the first status, the second status, or both of the one or more memory devices based at least in part on comparing the first voltage and the second voltage to a set of voltages associated with statuses of the one or more memory devices.

9. The method of claim 8, wherein the first voltage is lower than the second voltage.

10. The method of claim 8, wherein biasing the pin to the first voltage or biasing the pin the second voltage comprises:
coupling the pin with a voltage source based at least in part on the first status of the one or more memory devices, the second status of the one or more memory devices, or both.

11. The method of claim 8, wherein biasing the pin to the first voltage and the second voltage is based at least in part on a resistance of one or more drivers coupled with the one or more memory devices.

12. The method of claim 8, further comprising:
transmitting the chip enable signal to the one or more memory devices;
determining the first status, the second status, or both of the one or more memory devices based at least in part on the chip enable signal; and
biasing the pin to a third voltage based at least in part on the first status, the second status, or both of the one or more memory devices.

13. The method of claim 8, wherein determining the first status, the second status, or both of the one or more memory devices comprises:
comparing a current of the pin to a set of currents associated with the statuses of the one or more memory devices, wherein the current of the pin is based at least in part on the pin being biased to the first voltage or the second voltage.

14. The method of claim 8, wherein the second voltage satisfies a threshold voltage that indicates that the one or more memory devices are inaccessible.

15. A non-transitory computer-readable medium storing code, the code comprising instructions executable by one or more processors to:
bias, by one or more controllers, a pin configured to receive a chip enable signal for one or more memory devices to a first voltage, the first voltage corresponding to a first status of the one or more memory devices, the first status indicating that the one or more memory devices are accessible;
bias, by the one or more controllers, the pin to a second voltage, the second voltage corresponding to a second status of the one or more memory devices, the second status indicating that the one or more memory devices are inaccessible; and
determine the first status, the second status, or both of the one or more memory devices based at least in part on comparing the first voltage and the second voltage to a set of voltages associated with statuses of the one or more memory devices.

16. The non-transitory computer-readable medium of claim 15, wherein the first voltage is lower than the second voltage.

17. The non-transitory computer-readable medium of claim 15, wherein, to bias the pin to the first voltage or to bias the pin to the second voltage, the instructions are further executable by the one or more processors to:
couple the pin with a voltage source based at least in part on the first status of the one or more memory devices, the second status of the one or more memory devices, or both.

18. The non-transitory computer-readable medium of claim 15, wherein the instructions are further executable by the one or more processors to bias the pin to the first voltage and the second voltage based at least in part on a resistance of one or more drivers coupled with the one or more memory devices.

19. The non-transitory computer-readable medium of claim 15, wherein the instructions are further executable by the one or more processors to:

transmit the chip enable signal to the one or more memory devices;
determine the first status, the second status, or both of the one or more memory devices based at least in part on the chip enable signal; and
bias the pin to a third voltage based at least in part on the first status, the second status, or both of the one or more memory devices.

20. The non-transitory computer-readable medium of claim 15, wherein to determine the first status, the second status, or both of the one or more memory devices, the instructions are executable by the one or more processors to:
compare a current of the pin to a set of currents associated with the statuses of the one or more memory devices, wherein the current of the pin is based at least in part on the pin being biased to the first voltage or the second voltage.

\* \* \* \* \*